(12) United States Patent
Percheron et al.

(10) Patent No.: US 7,716,800 B1
(45) Date of Patent: May 18, 2010

(54) SINGLE-PIECE PART FOR MAKING A CABLE ANCHORING JAW AND METHOD FOR MAKING SUCH A JAW

(75) Inventors: Jean-Claude Percheron, Vienne-En-Arthies (FR); Manuel Peltier, Paris (FR)

(73) Assignee: Freyssinet International (STUP) (FR)

( * ) Notice: Subject to any disclaimer, the term of this patent is extended or adjusted under 35 U.S.C. 154(b) by 0 days.

(21) Appl. No.: 09/744,600

(22) PCT Filed: Jul. 26, 1999

(86) PCT No.: PCT/FR99/01830

§ 371 (c)(1),
(2), (4) Date: Jan. 26, 2001

(87) PCT Pub. No.: WO00/06925

PCT Pub. Date: Feb. 10, 2000

(30) Foreign Application Priority Data

Jul. 28, 1998 (FR) .................................. 98 09664

(51) Int. Cl.
*B23P 17/00* (2006.01)
*F16G 11/04* (2006.01)

(52) U.S. Cl. .......................... 29/413; 29/414; 24/122.3; 24/122.6

(58) Field of Classification Search .................. 29/412, 29/413, 416, 417; 24/122.3, 122.6; 52/223.13
See application file for complete search history.

(56) References Cited

U.S. PATENT DOCUMENTS

| | | | | |
|---|---|---|---|---|
| 2,357,733 A | * | 9/1944 | Guderian | 29/517 |
| 4,707,890 A | * | 11/1987 | Savall et al. | 29/413 |
| 5,802,788 A | * | 9/1998 | Ozawa et al. | 24/122.6 |

* cited by examiner

*Primary Examiner*—Robert J Sandy
(74) *Attorney, Agent, or Firm*—Cantor Colburn LLP

(57) ABSTRACT

The invention concerns a single-piece part for producing a cable anchoring jaw. The single-piece part includes several angular portions arranged about a generally cylindrical duct, assembled by clamps adjacent to the duct. Each clamp is located at the bottom of one particular radial slot extending between two portions from the part periphery. Each clamp has towards its own particular slot a surface whereof a part at least is inclined relative to the direction perpendicular to the slot radial plane, such that the clamp radial thickness has a minimum in a specific position along the direction, thereby ensuring the position where the clamp will be broken to obtain the jaw wedges from the part portions, which enables to better control for clamping the cable strand in the jaw.

5 Claims, 1 Drawing Sheet

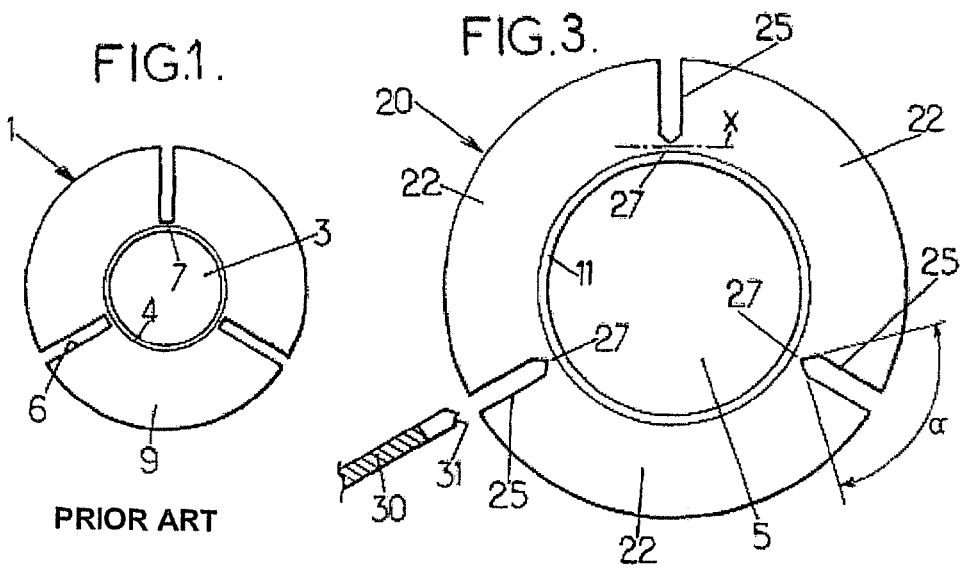
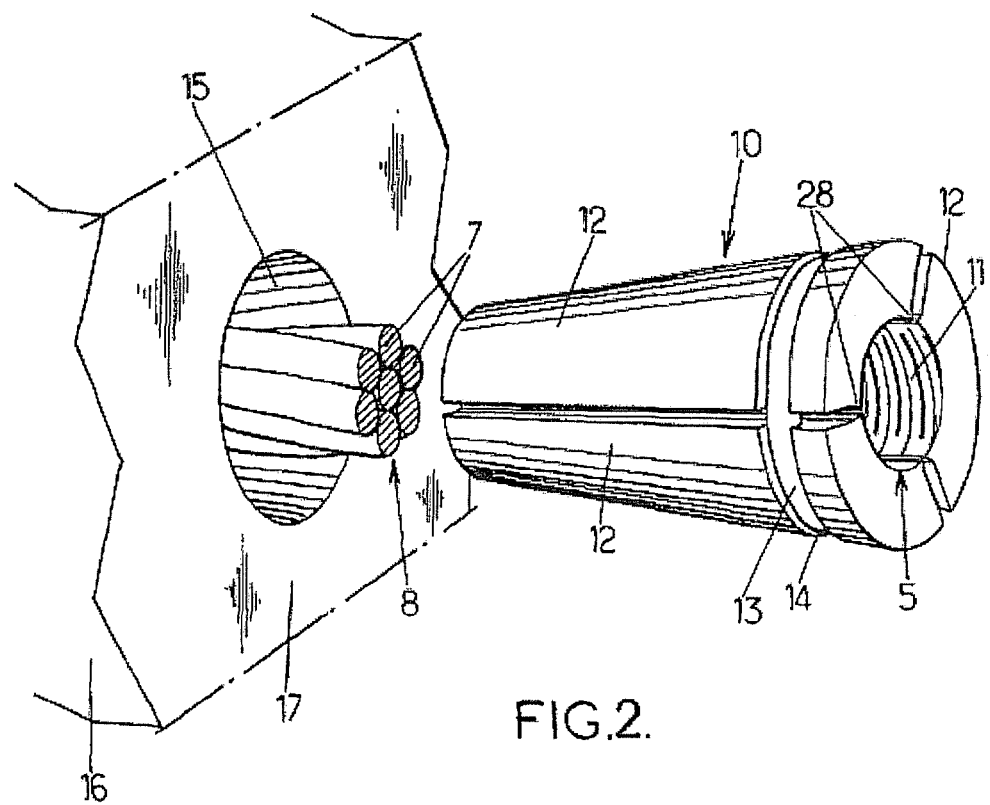

SINGLE-PIECE PART FOR MAKING A CABLE ANCHORING JAW AND METHOD FOR MAKING SUCH A JAW

TECHNICAL FIELD OF THE INVENTION

The present invention relates to the jaws used to anchor cables on anchoring blocks such as pre-stressing cables used in civil engineering applications, bridge stay cables,

DESCRIPTION OF THE RELATED ART

These jaws are usually of a frusto-conical shape, and they have an axial bore of a generally cylindrical shape which receives the cable tendon to be anchored. They co-operate with seats having at least one matching frusto-conical portion, those seats being cut through the anchoring blocks, with the cable tendons to be anchored extending therethrough.

The jaws in question consist of several (usually two, three or four) identical elements—that will be referred to as "wedges" hereafter—coming from an original component, delimited on the outside by a frusto-conical surface and having a cylindrical axial bore extending therethrough, the internal face of which is advantageously striated. The original component is divided into wedges by making saw cuts in two, three or four (or more) radial half-planes.

The wedges produced by sawing are subjected to a heat treatment to provide superficial hardening. An annular ring made from steel is located in a circular groove machined on the external frusto-conical surface of the original component in the vicinity of its wider base so as to assemble the wedges of the jaw.

French patent 2 586 076 describes an anchoring jaw comprising wedges which all come from the same original component. The saw cuts intended to split this component up into wedges are deliberately left unfinished so as to leave bridges of a slight thickness between contiguous wedges along the central bore of the component.

This method of making the jaw is suitable for mass production. Even though the cuts forming the wedges are not strictly regular and identical, it is ensured that their assembling as a jaw does not cause, between the wedges, non-complementary bearing surfaces which could deform the cylindrical bore in which the tendon is gripped. The manufacturing tolerances and quality controls are therefore less strict than in methods where the wedges are fully cut out and stored in bulk between the cutting and assembly processes.

FIG. 1 shows an end view of the single-piece component 1 from which a jaw with three wedges 9 is made according to French patent 2 586 076. The bridges 7, adjacent to the cylindrical bore 3, are located at the bottom of radial slots 6 resulting from saw cuts made from the periphery of the piece 1 across its entire length. The bridges are of small thickness (less than 1 mm), their main function being to hold the wedges 9 together until they are broken. The usual method used to make this break is to drive a separator member into the bore 3, the separated wedges being subsequently held by the assembling ring.

A problem encountered with jaws of this type is that the bridge rupturing is not well controlled. The bottom of the slot 6 is flat, so that the rupture may occur at any point along the thickness of the slot (direction perpendicular to the radial plane). The rupture may be of a zigzag pattern due to the transverse striations 4 formed by tapping in the wall of the cylindrical bore 3. Furthermore, the bridge 7 often breaks at several points.

These problems can be detrimental to the quality of the anchoring. If a piece of bridge remains on the radial face of a wedge at only certain points of the jaw length, this may cause the cylindrical bore to deform because of the imperfect contact bearing between adjacent wedges, which will affect the uniformity of the clamping action. Pieces of bridge may also be deformed or separated from the wedge under the effect of the stress applied during the anchoring process, in which case these pieces are likely to come in an undesirable manner between the wedges, between the wedges and the tendon or between the wedges and the frusto-conical orifice of the anchoring block.

It should be pointed out that for the tendon to be clamped uniformly, the diameter of its cylindrical bore is designed to be slightly smaller than that of the tendon to be anchored. Accordingly, once the striations of the jaw have penetrated the metal of the tendon to a certain degree and there has been a slight radial contraction in the tendon under the effect of the clamping stress, the bore approximately resumes its cylindrical shape so that the stress is transmitted uniformly onto the perimeter of the tendon.

The saw cuts made between the wedges leave between them the spaces necessary to transmit the clamping stress. If these spaces were not there, the radial clamping action exerted at the frusto-conical interface would result in a mutual clamping of the wedges along the radial planes, rather than the transmission of the clamping action to the tendon.

During the anchoring process, it should be avoided that some of these spaces reduce in size whilst others become larger. In the worst scenario for a jaw with N wedges, this would result in losing N−1 spaces and creating one space of a thickness N times greater. This would also lead to ineffective clamping of the tendon, which may cause slipping. In the typical situation where N=3 and where the cuts leave spaces of 1.5 mm between the wedges, one could end up with one space of 4.5 mm, which would be seriously detrimental to the anchoring of a conventional seven-wire strand whose peripheral wires have a diameter of 5 mm.

The fact that rupturing of the bridges is not very well controlled does not permit to eliminate this disadvantage of the conventional jaws.

SUMMARY OF THE INVENTION

An object the present invention is to improve jaws of the type described in French patent 2 586 076 by reducing the impact of the above-mentioned problems.

Accordingly, the invention proposes single-piece component for making a cable anchoring jaw, comprising several angular segments disposed around a bore having a generally cylindrical shape, joined by bridges adjacent to said bore, each bridge being located at the bottom of a respective radial slot extending between two segments from the periphery of the component. According to the invention, each bridge presents, towards its respective slot, a surface having at least a portion inclined relative to the direction perpendicular to the radial plane of said slot so that the radial thickness of said bridge is at a minimum at a determined position along said direction.

When the single-piece component is split up to produce the wedges corresponding to the angular segments, the bridges are more probably broken at the point where their thickness is at its minimum, i.e. at a point which can be controlled by using an appropriate cutting tool to form the radial slots in the component.

As a result, the clamping forces are better distributed on the periphery of the component across the clamping surface within the bridge.

The ledges which the broken bridges leave on the radial faces of the wedges at the edge of the cylindrical bore of the jaw are of a well-determined shape and they can assist in transmitting the forces to the tendon. By thus making use of the entire width of the angular segment, the distribution of forces is also improved (peak pressures are reduced).

Furthermore, these ledges virtually eliminate the problems explained above relating to excessive widening of one of the spaces between wedges.

In one advantageous embodiment, the surface that each bridge presents towards its respective slot is substantially V-shaped. The inclination of the faces of the V therefore allows the clamping forces to be transmitted across the entire surface of the striations generally present on the wall of the cylindrical bore, which significantly increases the uniformity of the clamping action on each of the wires making up the anchored tendon or strand. The inclination of the faces of the V also enables the wedge segments to be positioned so as to be regularly spaced by the normal radial sliding action of the wedge segment on the parts of the V.

According to another aspect, the invention proposes a method of manufacturing a cable anchoring jaw formed of an assembly of a number N of wedges, comprising the steps of:
  forming a bore of a generally cylindrical shape in a single-piece component;
  performing N cuts in the single-piece component from its periphery along radial planes to form N radial slots delimiting N angular segments of the component, at least N−1 of the cuts being interrupted before reaching the bore in order to leave bridges joining the segments at the bottom of the corresponding slots;
  subjecting the component thus obtained to a hardening treatment; and
  forcing apart the N sectors in order to break the bridges, each wedge of the jaw being obtained from one of the segments.

The interrupted cuts are performed so as to impart to each bridge a surface, directed towards the corresponding slot, of which at least part is inclined relative to the direction perpendicular to the radial plane of said slot so that said bridge breaks at a determined position along said direction.

BRIEF DESCRIPTION OF THE DRAWINGS

Other features and advantages of the invention will become clear from the description of examples below, which are not restrictive, and with reference to the appended drawings, in which:

FIG. 1, discussed above, is an end view of a single-piece blank for an anchoring jaw of the type disclosed in French patent 2 586 076;

FIG. 2 is a perspective diagram showing a single-piece blank for an anchoring jaw made according to the invention;

FIG. 3 is an end view of a single-piece blank for a jaw of the type illustrated in FIG. 2.

DETAILED DESCRIPTION OF THE PREFERRED EMBODIMENT

FIG. 2 illustrates the shape of an anchoring jaw 10 according to the invention, used to clamp a cable tendon 8 such as, e.g., a pre-stressing or stay cable strand. This exemplary jaw 10 has a generally frusto-conical shape with a central cylindrical bore 5, through which the strand 8 will be inserted, the internal wall of the bore having transverse striations 11 to provide a tight grip on the strand. This frusto-conical shape is divided into three angular segments of 120 degrees, formed by three identical wedges 12. These wedges 12 are assembled by means of an ring 13 located in a circumferential groove 14 close to the widest end of the jaw.

This jaw 10 engages a matching frusto-conical orifice 15 provided in an anchoring block 16. The procedure for anchoring a strand is as follows: the strand 8 is threaded through the orifice 15; the jaw 10 is placed around this strand; traction is applied to the strand at the part projecting beyond the external face 17 of the anchoring block 16, with the aid of a jack for example; and the jaw 10 around the strand is driven into the frusto-conical orifice 15. Once the traction force is released, the jaw 10 firmly clamps the strand 8 in the block 16.

As illustrated in FIG. 2, the strand 8 may consist of seven stranded metal wires.

The starting point for making a jaw 10 of this type is a single-piece component, known per se, delimited externally by a frusto-conical surface. An axial cylindrical bore 5 is formed through this frusto-conical component. FIG. 3 illustrates such a component 20.

The internal surface of the bore 5 is transversely striated, for example with a helical thread having a triangular profile, produced by tapping, which will produce the striations 11 on the internal faces of the wedges 12. The annular groove 14, not visible in FIG. 3, is machined into the frusto-conical face of the component 20 in the vicinity of its wide base.

The component 20 in question is advantageously made from low-carbon steel which is easy to machine but can be superficially hardened by a heat treatment such as cementation.

It is in this component 20 that radial slots 25 are cut, extending along planes passing through the axis of the component and delimiting the angular segments 22 that will form the wedges 12 of the jaw.

In the illustrated embodiment, the number N of slots 25 is three and they are spaced at angles of 120° around the axis of the bore. The thickness of these slots, determined by that of the cutting tool 30 used to make them, is 1.5 mm, for example. The slots 25 do not extend through the material of the component 20 up to the bore 5; each of them is interrupted so as to leave behind a bridge 27 along the bore 5.

As illustrated in FIG. 3, the base of each slot 25 is V-shaped, the apex pointing towards the axis of the component 20, i.e. towards the bore 5. In order to do this, the cutting tool used, which might be a mill or a circular saw 30, has teeth 31 on its cutting edge with a substantially V-shaped profile perpendicular to the cutting plane, i.e. teeth 31 whose pointed shape matches the V shape desired at the bottom of the slot 25.

The V shape at the bottom of the slot 25 makes it possible to control the point at which the bridge 27 will break when the wedges 12 are broken off. The bridge 27 will break by preference on a level with the apex of the V, i.e. approximately at the centre of the thickness of the slot 25.

In another embodiment, the bottom of the slot 25 might be of a flared shape other than a V profile. What matters is that this shape should be such that at least part of the surface of the bridge directed towards the slot is inclined relative to the direction X perpendicular to the radial plane of said slot so that the radial thickness of the bridge is at a minimum at a determined position along this direction X. It is on a level with this minimum that the rupture will occur. The advantage of using a V shape is that it is easy to achieve.

By way of example, the thickness of the bridge, as measured between the apex of the V and the wall of the bore 5, might be between 0.8 mm (at the bottom of the striations 11)

and 1.3 mm (at the top of the striations 11), the angle α between the two inclined faces of the V being 90°, for example.

It should be pointed out that in spite of the very fine thickness and the shape of the slot 25, it is relatively easy to control the sawing process because the three slots can be made simultaneously using three fine tools, the respective dimensions and positions of which will be strictly determined, and between which the part 20 will be axially forced.

Cut in this way, the jaw blank remains in a single piece and may be stored in bulk with other similar pieces.

The forces exerted on the bridges 27 at this stage are indeed much lower than those that would be needed to rupture them. The bridges have not been made brittle due to cementation at this stage and their function is essentially to conserve a link between the segments 22 corresponding to the wedges 12.

The single-piece components 20, not split into separate wedges as yet, will then be taken one by one to dispose the assembling ring 13 in each groove 14, this ring generally being made from spring steel.

The assembled unit is then subjected to the cementation treatment which provides the superficial hardening of the wedges 12 and the bridges 27.

This treatment may be a heating at a temperature of between 900 and 1000° C. for three quarters of an hour in a carbide atmosphere, the heating being followed by a quenching.

Treated in this manner, the steel then becomes superficially very hard and the bridges 27 become relatively brittle and easily broken.

At this stage, a hand pressure may be sufficient to break the bridges 27. Otherwise, a separator member is disposed at the opening of the bore 5 and the bridges are broken by hammering this member. The wedges 12 of the jaw are then separated from one another, remaining attached by the assembling ring 13.

As illustrated in FIG. 2, the broken bridges leave ledges 28 with an approximately triangular section on the radial faces of each wedge. These ledges 28 are adjacent to the bore 5 in which the jaw clamps the strand 8. They therefore assist in transmitting the clamping forces to the tendon, preventing the clamping force on the strand from being reduced over an excessive distance between the wedges. Correlatively, the peak pressures exerted on the strand are reduced.

The ledges 28 also prevent that, during the anchoring process, some of the inter-wedge spaces tend to shrink while another space widens.

A certain number of modifications may be made to the embodiment described here without departing from the scope of the invention, for example:

the number N of wedges may be other than three;

the periphery of the jaw might not be of a single frusto-conical shape; instead, it could be made up of several successive frusto-conical sections; it could also be curved;

one of the N cuts made in the component 20 might be a complete cut, the component remaining a single piece with only N−1 bridges;

the sequence in which certain steps of the method used to manufacture the jaw are performed might be varied.

The invention claimed is:

1. A method of manufacturing a cable anchoring jaw formed of an assembly of a number N of wedges, comprising:
    forming a bore of a generally cylindrical shape in a single-piece component;
    performing N cuts in the single-piece component from its periphery along radial planes to form N radial slots delimiting N angular segments of the single-piece component, at least N−1 of the cuts being interrupted before reaching the bore in order to leave bridges joining the segments at a bottom of corresponding slots;
    subjecting the single-piece component thus obtained to a hardening treatment; and
    forcing apart the N segments in order to break the bridges, each wedge of the jaw being obtained from one of the segments,
    wherein the interrupted cuts are performed so as to impart to each bridge a surface, directed towards the corresponding slot, of which at least a portion is inclined relative to a direction perpendicular to a radial plane of the slot so that the bridge breaks at a determined position along the direction.

2. A method as claimed in claim 1, wherein said N−1 cuts are made by at least one tool having teeth with a substantially V-shaped profile perpendicular to a cutting plane.

3. A method as claimed in claim 1, further comprising tapping the bore to form transverse striations on an internal face of each wedge.

4. A method as claimed in claim 1, further comprising:
    forming an annular groove on the periphery of the single-piece component; and
    placing an assembling ring in the annular groove prior to the hardening treatment.

5. A method as claimed in claim 3, further comprising: forming an annular groove on the periphery of the single-piece component; and placing an assembling ring in the annular groove prior to the hardening treatment.

* * * * *